(12) United States Patent
Castro et al.

(10) Patent No.: US 8,769,098 B2
(45) Date of Patent: Jul. 1, 2014

(54) FAIR USAGE ENFORCEMENT IN ROAMING PACKET BASED ACCESS

(75) Inventors: Fabian Castro, Madrid (ES); Juan Pedro García Cervigón, Madrid (ES); Ana Maria Lopez Nieto, Madrid (ES)

(73) Assignee: Telefonaktiebolaget L M Erisson (publ), Stockholm (SE)

( * ) Notice: Subject to any disclaimer, the term of this patent is extended or adjusted under 35 U.S.C. 154(b) by 81 days.

(21) Appl. No.: 13/390,901

(22) PCT Filed: Aug. 20, 2009

(86) PCT No.: PCT/EP2009/060806
§ 371 (c)(1),
(2), (4) Date: May 4, 2012

(87) PCT Pub. No.: WO2011/020514
PCT Pub. Date: Feb. 24, 2011

(65) Prior Publication Data
US 2012/0210003 A1    Aug. 16, 2012

(51) Int. Cl.
*G06F 15/173*    (2006.01)
*H04L 12/14*    (2006.01)

(52) U.S. Cl.
CPC ............ *H04L 12/14* (2013.01); *H04L 12/1403* (2013.01)
USPC ........................................ 709/225; 709/223

(58) Field of Classification Search
CPC ... H04L 12/14; H04L 12/1403; H04M 15/00; H04M 15/80; H04M 15/8038; H04M 15/8214; H04W 4/24
USPC ......................................................... 709/225
See application file for complete search history.

(56) References Cited

U.S. PATENT DOCUMENTS

| | | | |
|---|---|---|---|
| 6,917,798 | B1 | 7/2005 | Hake et al. |
| 2002/0151312 | A1 | 10/2002 | Rosemarijn Bos et al. |
| 2004/0146040 | A1 | 7/2004 | Phan-Anh et al. |
| 2004/0165594 | A1 | 8/2004 | Faccin et al. |

FOREIGN PATENT DOCUMENTS

| | | | | |
|---|---|---|---|---|
| EP | 1250023 | A1 | 10/2002 | |
| EP | 1898591 | A1 * | 3/2008 | .............. H04L 29/06 |
| JP | 2002027147 | A | 1/2002 | |
| JP | 2002513520 | A | 5/2002 | |
| JP | 2002523984 | A | 7/2002 | |
| WO | 2006107647 | A1 | 10/2006 | |
| WO | 2008039114 | A1 | 4/2008 | |
| WO | 2009049684 | A1 | 4/2009 | |

OTHER PUBLICATIONS

3GPP TS 23.203 V8.2.0 (Jun. 2008), pp. 2-106.*

(Continued)

*Primary Examiner* — Hee Soo Kim
(74) *Attorney, Agent, or Firm* — Coats and Bennett PLLC

(57) ABSTRACT

Means and methodology for a Policy and Charging Rule Function, in a network visited by a roaming terminal, to determine its role and mode of operation in concurrence with a Policy and Charging Rule Function in the home network of that terminal. The role is determined base on the fact the terminal is roaming, a roaming agreement exists between both networks or can be established and visitor network's operator rules. Determining mode of operation comprises negotiation and possible rule transfer between visited network and home network Policy and Charging Rule Functions.

15 Claims, 9 Drawing Sheets

| Role | Subscription rules | Operator rule |
|---|---|---|
| Standard PCRF | Yes | local only |
| V-PCRF | Yes | Home & Local |
| Limited PCRF | No | Local only |

(56) References Cited

OTHER PUBLICATIONS

3rd Generation Partnership Project. "Role of V-PCRF and H-PCRF." 3GPP TSG-SA WG2 Meeting #65, S2-084133, Prague, Czech Republic, May 12-16, 2008.

3rd Generation Partnership Project; "Diameter Charging Applications"; 3GPP TS 32.299 V12.3.0 (Dec. 2013); Technical Specification Group Services and System Aspects; Telecommunication Management; Charging Management; (Release 12); 2013; pp. 1-159; 650 Route des Lucioles—Sophia Antipolis, Valbonne, France.

3rd Generation Partnership Project; "Architecture Enhancements for Non-3GPP Accesses", 3GPP TS 23.402 V12.3.0 (Dec. 2013); Technical Specification Group Services and System Aspects; (Release 12); 2013; pp. 1-288; 650 Route des Lucioles—Sophia Antipolis, Valbonne, France.

3rd Generation Partnership Project; Policy and Charging Control Signalling Flows and Quality of Service (QoS) Parameter Mapping; 3GPP TS 29.213 V12.2.0 (Dec. 2013); Technical Specification Group Core Network and Terminals (Release 12); pp. 1-204; 650 Route des Lucioles—Sophia Antipolis, Valbonne, France.

Calhoun, P. et al.; "Diameter Base Protocol", RFC 3588, Sep. 2003; pp. 1-147; Network Working Group, Request for Comments: 3588; Category: Standards Track.

Hakala, H. et al.; "Diameter Credit-Control Application", RFC 4006, Aug. 2005; pp. 1-114; Network Working Group, Request for Comments: 4006; Category: Standards Track.

\* cited by examiner

Transparent rule set definition

Rule-set := ( "<", N "," ( [Rule] | "" ) { "," N "," [Rule] "," > )   N = unique number for identifying a rule in the rule set
                                                                      "" = delete rule N

[Rule] := ( [CI] "," [initial state] "," [Rule type] "," [Rule body] )
[CI] := ( integer )                                                   control class indicator
[Initial state] := ( 0 | 1 )                                          "ON" = 1 | "OFF" = 0
[Rule type] := ( 0 | 1 | 2 )                                          "Control" = 0 | "Trigger" = 1 | "Event" = 2

Rule type = "Control"

[Rule body] := [Value list]
[Value list] := ( [value] { "," [value] } )
[Value] := ( integer | real | complex | alphanumerical | text )       note: ";" should not occur in text Rule type = "Trigger"

[Rule body] := ( [upper] "," [lower] )
[upper] := [value]                                                    upper = lower => trigger if equal
[lower] := [value]                                                    upper = ""          => trigger if < lower
                                                                      lower = ""          => trigger if > upper
                                                                      upper > lower       => trigger if > upper or < lower
                                                                      upper < lower       => trigger if > upper and < lower
in case of text value based on alpha numerical value Rule type = "Event"                                                   With Event rule the CI can have any value as it is don't care.

[Rule body] := [Boolean trigger expression] "," [list rules to switch off] "," [list rules to switch on]
[Boolean trigger expression] := [expression]
[expression] := "(" { NOT } (N | [expression]) [operator] { NOT } (N | [expression]) ")" )
[operator] := ( AND | OR | XOR )
[list rules to switch off] := ( N { , N } )
[list rules to switch on] := ( N { , N } )                            If rule in both lists => toggle initial state.

*FIG. 7*

FAIR USAGE ENFORCEMENT IN ROAMING PACKET BASED ACCESS

FIELD OF TECHNOLOGY

The present disclosure relates to the control and enforcement of fair usage policies for users having a packet based connection through an access network.

BACKGROUND

Users connected with their mobile terminals in a radio network as part of a telecommunications network do not have unlimited use of resources in that telecommunication network. Such is limited by means of policies. Policies may have a general character such as maximum allowed bandwidth for mobile internet upload. These policies are mostly defined by the operator of the telecommunication network and made applicable to all users to allow shared use of services. Policies may on the other hand be part of the subscription. A user having a premium subscription pays more for having more download bandwidth for mobile internet than a user with a regular subscription. This is a typical quality of service (QoS) policy.

Quota control is another area of policies for fair usage control. Charging is used as general term but it also includes quota control. Typical real charging control example is users having a prepaid subscription. When a user makes use of a service in the telecommunication system that has a use dependent charging, that service will reserve credit from the users prepaid account prior to rendering the service. When that credit is used or almost used, again credit is requested by the service. At the end only actual consumed credits are reported back by the service and the remainder is added back to the account. The operator can define as a policy a maximum amount that a service may reserve or a maximum time a credit may stay reserved etc.

Typical example of quota control for fair usage is a user having a subscription that allows maximum 350 Mb per month mobile internet download. Also here a likewise reservation mechanism and subsequent operator policies may be applied.

The above described policies are combined in fair usage control as shown in the table below;

| Subscription type | Bandwidth limit | Quota limit/ month | Additional rule |
| --- | --- | --- | --- |
| Premium | 3.6 Mb | 5 Gb | >5 Gb down to 128 Kb/s |
| All in one | 1 Mb | 1 Gb | >1 Gb operator portal only |
| regular | 3.6 Mb | 350 Mb | >350 Mb operator portal only |

The additional rules are policies defining what to do if quota is exceeded, alternative for simply deny service. The combination of QoS, Quota, and additional rules is seen as a set of fair usage control policies.

The discussed limitations are generally seen as rules to be applied by the telecommunication system. Many of these rules are stored with other subscription details in a repository with user subscription data like the HLR (Home Location Register) in the GSM system. Operator defined general rules could be added to each subscription but this would make updating a cumbersome task. For that reason the circuit switched type of telecommunication system had already defined a rule repository function where the operator could add overall applicable rules and the subscription based rules were aligned with the subscription repository. The rule repository function combined policies to one set to be applied to a certain user having a subscription in the network. Also already known in the circuit switched type of telecommunication system was that in the end rules must be enforced. Enforcement typically takes place in the dedicated nodes of the telecommunication system where the actual resources are controlled. For that purpose policy or rule enforcement points were defined that included in the nodes or locally connected to the nodes took care of the enforcement of rules in the rule repository.

Evolution in telecommunication systems has its progress and IP based information exchange has been taken as core transport for the telecommunication system. This is commonly denoted as 3GPP packet switched domain or packet core network. At the same time the telecommunication system opens up to allow other non radio access terminals on IP basis. The known circuit switched policy handling was no longer sufficient in an all IP domain. Crucial is that in the packet switched domain there is no longer a dedicated circuit for the user on which policy enforcement can take place. Packets can take a multitude of dynamic routes to their destination. Therefore a new concept on policy control and enforcement was required. 3GPP has started a new standardization for policy/rule handling in 3GPP TS 23.203. This standard shall cover all current packet access technologies like GPRS, LTE, WLAN and Wifi, Docsis etc. for the purpose of Policy and Charging Control (denoted as PCC in the standard).

Like in the circuit switched domain the standard defines a central rule decision function PCRF (Policy and charging rule function) and the decentralized enforcement function PCEF (Policy and Charging Enforcement Function). Further referring to FIG. 1 the 3GPP defined architecture for PCRF and PCEF is discussed.

In absence of a fixed circuit with assigned resources an alternative is needed on which policy enforcement could take place. Starting point is the registration of the user terminal to the access network. User terminal must be seen widely as being a mobile phone connecting to the GSM/UMTS/LTE radio network, a lap top PC connecting via WIFI or WLAN, or a fixed PC via DOCSYS cable system, etc. After registration the user equipment has been assigned an IP address. As part of the registration on the access network also an IP-CAN (IP Connectivity Access Network) session is established. The establishment of the IP-CAN session comprises amongst others the binding of one or more IP-bearers. The IP bearer is a virtual point to point transport channel for packages through an IP network. When the user terminal is connected via radio channel the IP bearer runs from radio access point (radio base station, E-nodeB or WLAN access point etc.) to the gateway. The bearer between radio access point and user terminal is defined as radio bearer. Both bearers are so shared by multiple user terminals. The bearers are intended for transportation of packages related to contents going to or coming from the user terminal (voice, data, internet pages, video etc.). It does not include signalling related to access network registration and control.

As IP bearers are virtual channels they have a planned capacity as part of overall IP transport network capacity planning. When an IP bearer is bound to an IP-CAN session it becomes an IP-CAN bearer from the view point of the IP-CAN session. Part of the binding is an agreement on the quality of service (QoS). Without agreement packages are transported on Best Effort (BE). Instead agreements can be made on the bit rate, error rate, package delay, packet loss rate, etc. Each of these characteristic is denoted as a QoS Class Identifier (QCI). Important example is the bit rate which is agreed as Guaranteed Bit Rate (GBR). Which value is assigned to a QCI is subject of policy control. The application of policy control should be seen as QoS reservation. It shall be noted that the binding of IP bearers to an IP-CAN session is dynamic and can change in time due to specific contents requests of the user. Example is request use of a certain application function (AF) by the user which requires an IP-bearer with a certain QoS. The actual binding is performed by the Bearer Binding Function (BBF) under control of the PCRF. The BBF is an integrated function of the Bearer Binding Enforcement Rule Function (BBERF) and the PCEF.

As described earlier there is a difference between operator defined and general applicable rules and subscriber specific rules. The first category is maintained in the PCRF. The second category is collected by the PCRF from a Subscription Profile Repository (SPR) by means of a request via the Sp interface when a user terminal registers with the access network. The SPR can be any data base function holding Subscriber information containing rules, e.g. HLR or AAA server. The SPR updates the PCRF when any change occurs in the subscription. The PCRF informs the SPR when a user terminal deregisters from the access network. The identification used is depending on the type of access network e.g. the IMSI (ISDN mobile station Identifier), PUI (public user identity), or the like.

Certain rules of the PCRF require continuous enforcement while other rules need to be enforced after a certain event. Events are reported to the PCRF by the ERF (event reporting function). The ERF resides in the BBERF or the PCEF. Also the AF can report events to the PORE In the ERF case the PCRF subscribes for notifications of certain events for a dedicated user. The AF event reporting is to be seen as new or changed requirements to rule enforcement based on user requests for contents.

So far QoS enforcement is discussed as applied in establishing the IP-CAN session and binding of IP-bearers. There are other areas for which rules require enforcement.

One other specific area is packet filtering. Example is the limitation to the operator portal web pages only when quota is exceeded, or operator blocking from illegal download sites. Packet filtering is enforced by the PCEF in the gateway. The PCRF provides the filtering criteria to the PCEF upon user terminal registration or after a reported event.

Last area of policy control is the charging control. This includes both online and offline charging. Offline charging is the generation of charging records (CDR: Charging Data Record) to the offline Charging system (OFCS) by the gateway or application function. Online charging comprises not only money wise credits like for a prepaid account but also includes quota management, hence the more general term credit control. Whether account or quota online charging can be event, time or volume based. Online charging is specific to an IP bearer in an IP-CAN session. So concurrent charging will occur. This means that in time or volume based control credit reservations are made, and remaining credits are returned. Policy rules define items like the maximum reservation amount and maximum time a reservation may be outstanding. Online charging is performed by the OCS and enforced by the PCEF on the gateway.

For further details reference should be made to the 3GPP TS 23.203 and 23.402.

The current standardization has not yet provided a solution on how subscription based quota limits as contained in subscriptions in the SPR can be obtained and controlled by the OCS. A currently proposed solution is that the PCRF performs quota control for fair usage itself based on additional functions and extension of the Gx interface. Full details are provided in 3GPP TS 23.203 CR 0237. This provides an advantage that other rules controlled by the PCRF can be combined with this OCS type of quota control.

For fair usage control the main problem is that it is not defined how it should operate when the terminal is roaming, connected via another (visited) network then its home network. In that case both home and visited network have PCRF and PECF/BBERF functions that need to co-operate. This is best seen with concurrence of operator defined rules. Apart from the operator rule concurrence the visiting terminal can have different connection scenario's to local services and services in the home network. Therefore PCEF can be in either network and yet need to be controlled with a single coherent rule set.

BRIEF DESCRIPTION OF THE DRAWINGS

FIG. 7 shows a transparent rule set definition coding paradigm.

SUMMARY

Figure 1:
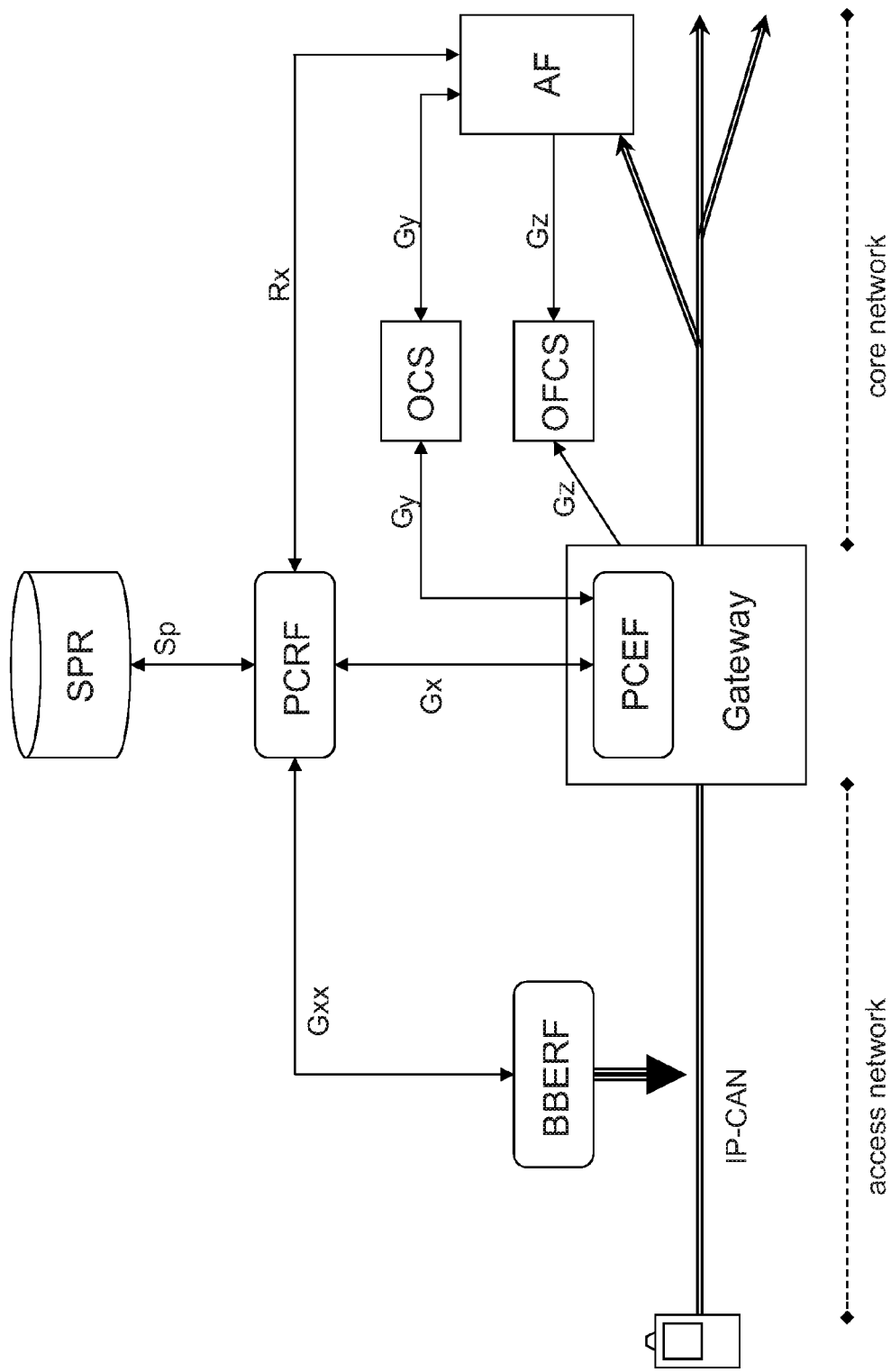
FIG. 1 shows a 3GPP defined architecture, including a PCRF and a PCEF.

The invention disclosed, provides the network with the capability to enforce a coherent rule set in both visited and home network. This is achieved by a first Policy and Charging Rule Function (PCRF) in a network visited by a roaming terminal having a subscription in a home network, where the first PCRF determines that the terminal is roaming. The first PCRF then retrieves an address of a second PCRF in the home network and checks if a roaming agreement exists with that network operator. When the roaming agreement exists the first PCRF takes the visited network PCRF role.

In case such a roaming agreement does not exist the first PCRF has the option to negotiate a temporary roaming agreement with that network. If successful the first PCRF can take the V-PCRF role.

When no roaming agreement is present or can be established, the first PCRF has one further option to check if visited network operator rules allow limited access. If the rules allow the PCRF takes the role of limited PCRF enforcing only visited network operator rules.

If limited access is not allowed access must be denied by the first PCRF.

The first PCRF can obtain the address of the second PCRF from an internal database where roaming agreements can be stored or it resolves the address via a Diameter Routing Agent.

Once having taken the V-PCRF role, the first PCRF negotiates a mode of control with the second PCRF.

If the mode of control negotiated makes it required the first PCRF receives from the second PCRF a set of rules to be enforced in the visited network.

In a further aspect the capability is provided by a PCRF in the home network that receives a first message of said first PCRF and takes the home network PCRF (H-PCRF) role. The H-PCRF checks the first received message for presence of requested mode of operation information elements. If these are absent the H-PCRF acts on basis of the second PCRF operating in a standard defined mode. If present than the H-PCRF checks the requested mode of operation against internal rules and determines a wanted mode of operation. It then returns a Diameter answer message and includes an additional mode of operation information element containing the wanted mode of operation.

If that wanted mode of operation makes it required the H-PCRF can add a container with a rule set to said answer message.

DETAILED DESCRIPTION

In its release 9, 3GPP TS 23.203 anticipated on the roaming situation in that it defines a V-PRCF and a H-PRCF as entity in respectively the visiting and home network. Also 2 basic scenarios are identified, one for home routed IP access and one for local based IP access. In practice a mix of both scenarios might be applicable for a roaming terminal. The standard has further identified an S9 interface between V-PCRF and H-PCRF. A short elaboration is given, with reference to FIGS. 2 and 3, on the differences of the 2 scenarios. More detailed information is provided by the 3GPP TS 23.203 R9 and TS 23.402 V9.0. Selection of home routed access or local breakout is determined by the access node in the visiting network. Based on the APNs in the terminal's subscription and the network/country code in the terminal registration ID. The selection is made in the visited gateway based on rules defined by the operator of the visited network. A mix can be determined as the selection is made per APN.
Home Routed Access, FIGS. 2a and 2b.

In home routed access the actual IP connectivity (for a specific APN) is provided in the home network. The connectivity in the visited radio network part is controlled by the BBERF in the visited network (V-BBERF). The gateway node in the visited network provides an IP tunnel to the access gateway in the home network. Connectivity in the core network is controlled by the H-PCEF in the Home access gateway.

Currently 2 defined methods exist for purpose of rule enforcement. In the first method the control of the V-BBERF is provided through trough the established IP tunnel to the home gateway. The H-PCRF so controls the V-BBERF. The PCRF in the visited network is not involved at all as it is not triggered for a registering terminal. The second method lets the V-BBERF be controlled by the PCRF in the visited network. Also this selection is determined in the visiting network's gateway at terminal registration by rules defined by the visiting network's operator. Again selection is made per APN.
Local Breakout, FIG. 3.

With local breakout the actual IP connectivity (for a specific APN) is provided in the visited network via the visited network access gateway. This will typically be the case when a service in the visited network is used as alternative service. In this scenario control is in the visited network where the PCRF of the visiting network controls both radio access network connectivity and core network connectivity with the V-BBERF and V-PCEF.

In the further discussion the home routed method 1 is omitted as the PCRF of the visiting network is not involved.

In either scenario the subscription based rules in the SPR are maintained in the H-PCRF. Operator based rules are present in both V-PCRF and H-PCRF. Final responsibility for policy control lies with the H-PCRF, but several mixes of delegation can be identified. For this an inter PCRF interface is required. In most common cases the initial registration will be for the home routed access based on the initial requirements in the subscription. Multi network operators can however decide that a closest replacement function is offered instead of the home routed access which will be applied during registration. Typical example is plain internet access which can be rendered by the local gateway faster.

Figure 4:
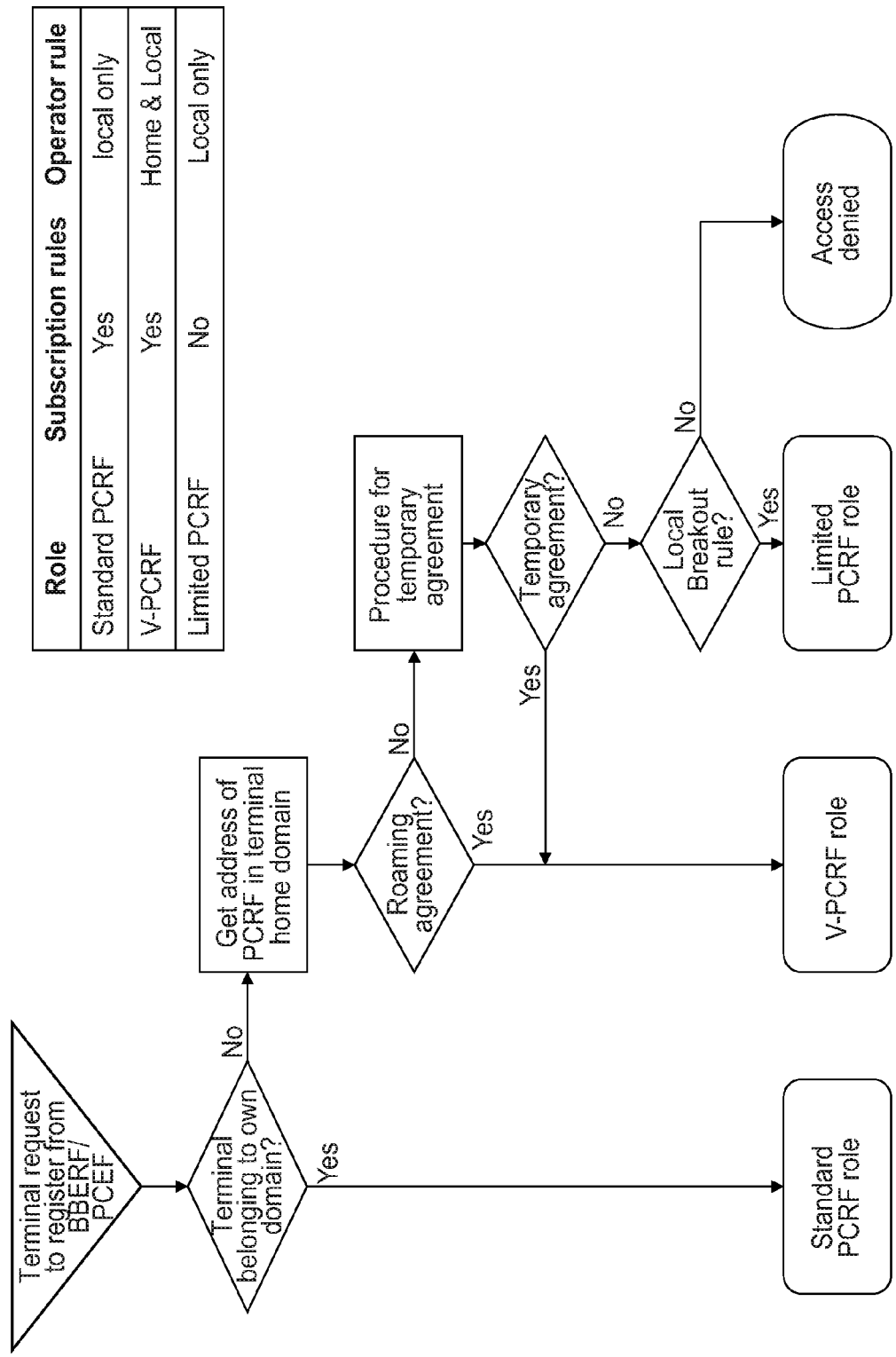
FIG. 4 shows a Visited network's PCRF role determination.

As starting point a roaming terminal registers in the visited network. Referring to FIG. 4 the PCRF of the visiting network receives a request for policies from the BBERF (and in case of local breakout also from the PCEF). The BBERF requires them to bind bearers for the terminal in the IP-Can session for that terminal. Contrary to the prior art the PCRF needs now first to see what role it needs to take. When a terminal registers the PCRF will request a SPR for the subscription details belonging to the identity of the terminal that wants to register. At the same time the PCRF checks if the terminal belongs to the defined home domain of the PCRF. If so the PCRF stays in its normal PCRF role. If not then the PCRF tries to obtain the address of the PCRF in the home domain of the terminal. It can therefore search its own PCRF locator database of already known PRCFs or use an external function like DRA as defined in 3GPP TS 29.213. Having the identity of the PCRF in the home domain a second check is done whether a roaming agreement exists with the operator of the terminal's home network. In case there is a roaming agreement, the terminal's home domain PCRF was stored in the PCRF locator database, the PCRF will further take the V-PCRF role. If no roaming agreement exists the PCRF can try to start the routine for negotiating a temporary roaming agreement with the terminal's home domain PCRF. Obtaining a temporary roaming agreement with another network is especially advantageous as it can be reused, as long as it is not expired, for other terminals having a subscription in that network.

If this is successful the PCRF will continue in the V-PCRF role. If not successful, or temporary roaming negotiation is not implemented, further action relies on policies set by the visited network operator. If no policies for access of visiting terminals without roaming agreement access must be denied. The visited network operator has however the possibility to have local rules for limit rights access to for example the operators own home pages. The operator can in this way provide the user of the visiting terminal the possibility to register with a credit card and so provide a certain prepaid amount that can be used. Until the prepaid amount is obtained the PCRF will have the limited PCRF role. After that it can assume the full PCRF role. The rules applied will not be the rules as stated in the subscription of the terminal but the visited operators rule set based on the selection of options made by the user on the web registration page. This is also an example of local breakout as the gateway of the visited network is used instead of the gateway of the home network.

Second step is to determine how the actual role of the V-PCRF will look like. There are several options;

Full transparency: The V-PCRF will relay received messages from enforcement functions to the H-PCRF and vice versa.

Limited local enforcement: The V-PCRF will deploy a rule set received from the H-PCRF without applying local rules for fair usage.

Full local enforcement: The V-PCRF will deploy the local operator rules for fair usage together with the rule set received from the H-PCRF although with a number of constraints. For the constraints see the sections on concurrence considerations.

Figure 5:
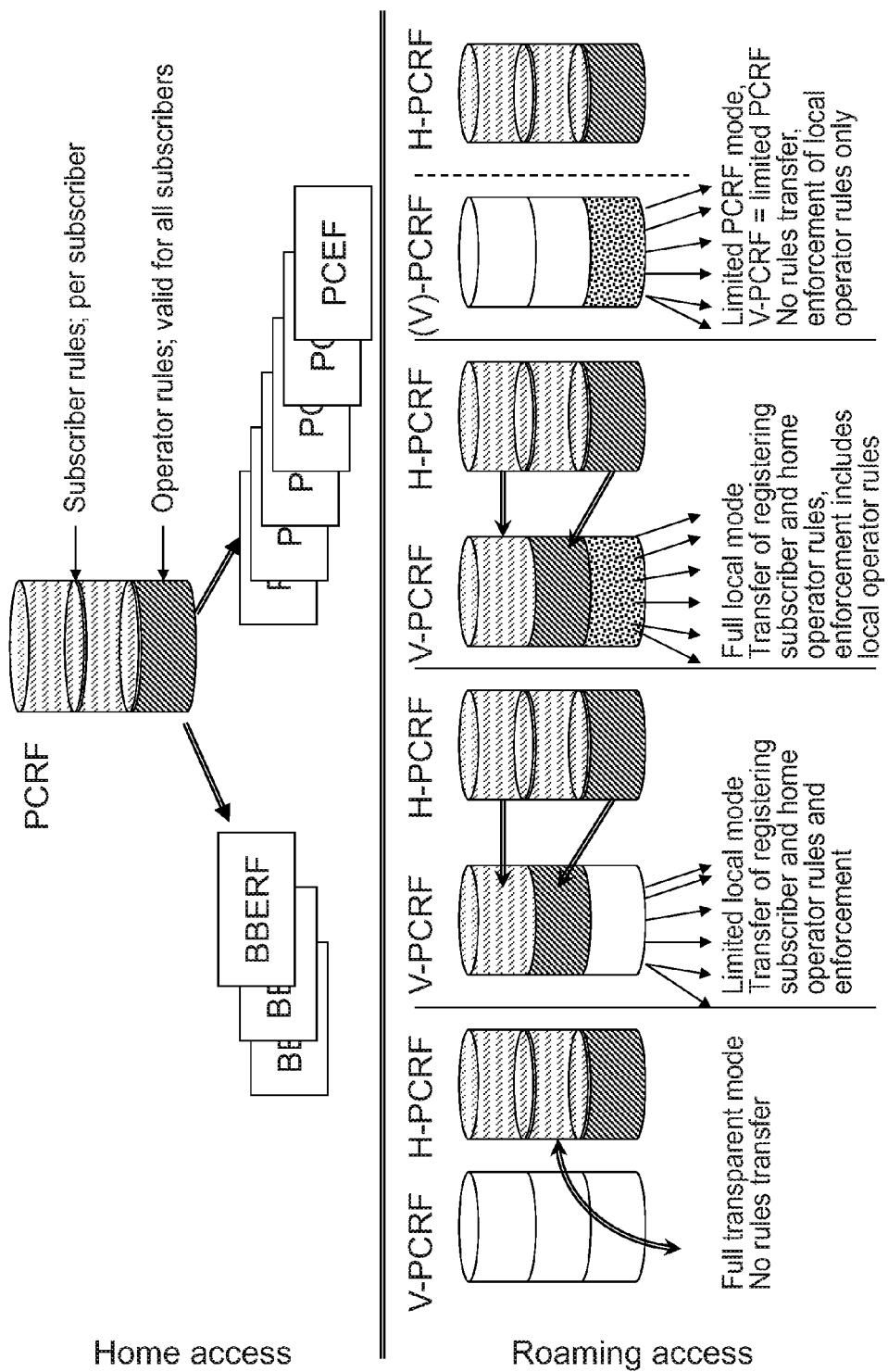
FIG. 5 shows a Mode dependent rule sets.
Figure 6:
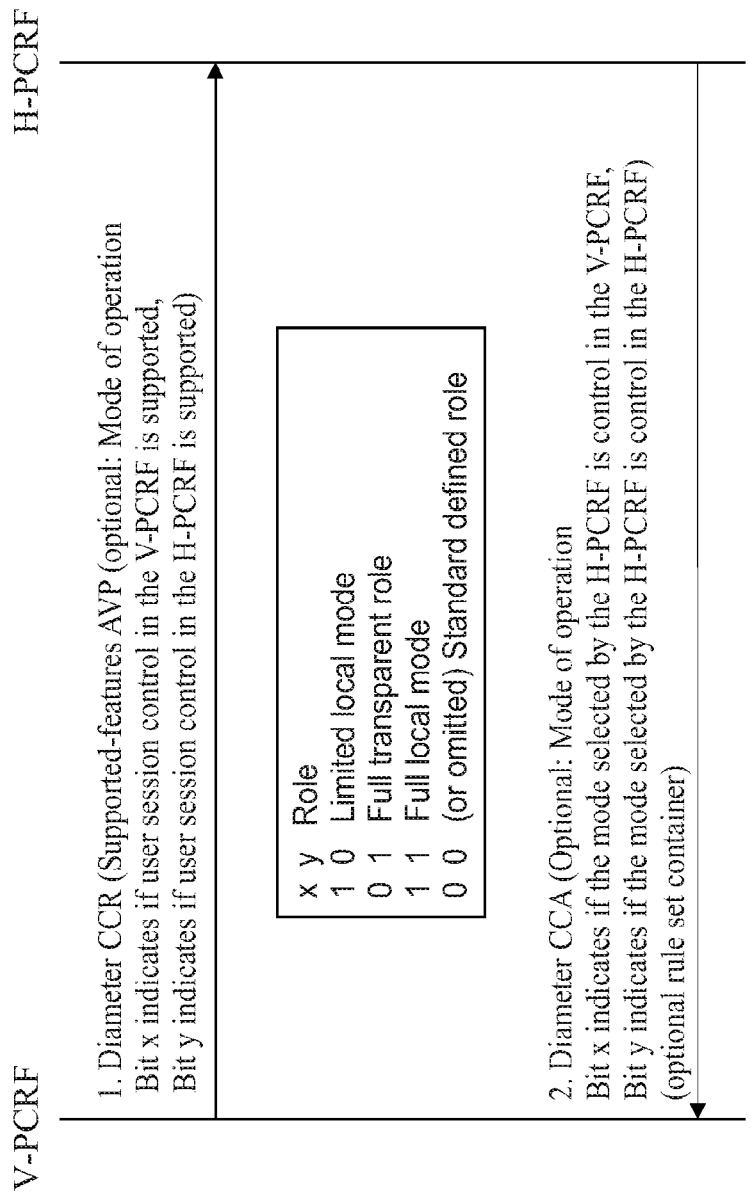
FIG. 6 shows a negotiation of roles between the V-PCRF and the H-PCRF.
Figure 8:
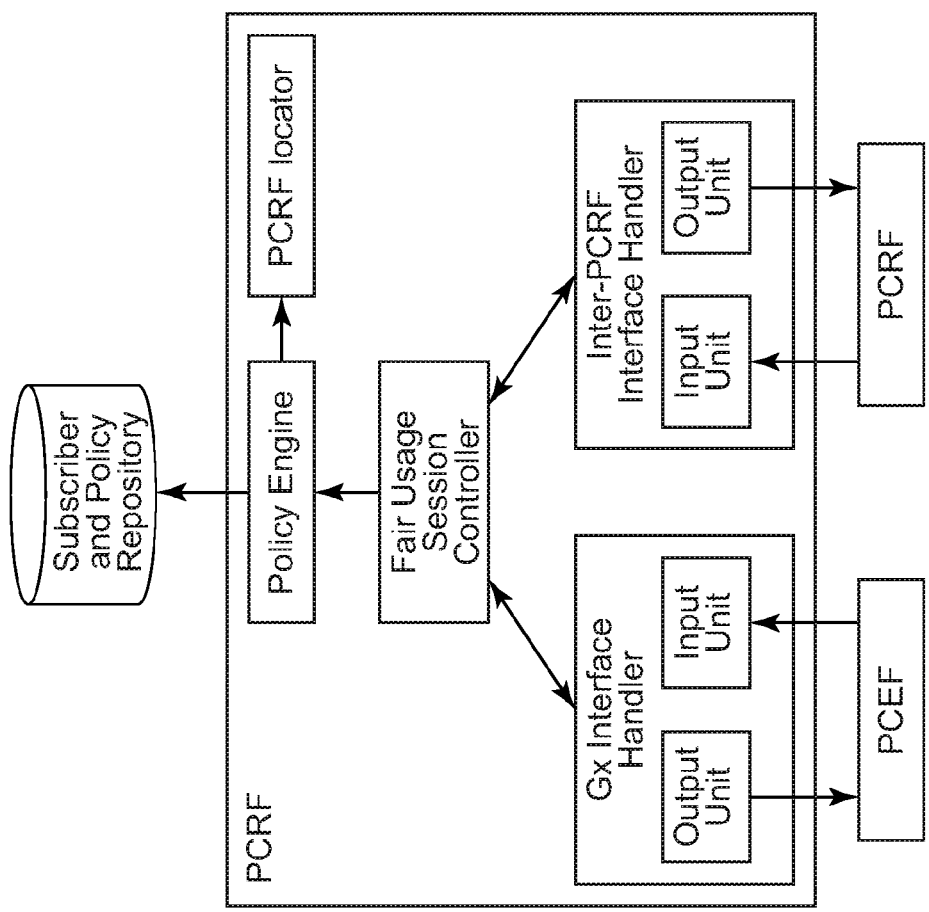
FIG. 8 shows a PCRF according to the invention.

Which rules apply in which case is outlined in FIG. 5. Note that the fourth case is a case where the V-PCRF function as a standard (but limited) PCRF as for a terminal belonging to the own domain.

The V-PCRF can assume a standard defined role or negotiate a role with the H-PCRF. In case of assuming a standard defined role no negotiation of a role with the H-PCRF takes place. The first Diameter message received by the H-PCRF from the V-PCRF does not contain a proposed role by the H-PCRF and the H-PCRF assumes that the V-PCRF takes the standard defined role. When the V-PCRF does want to negotiate a role it has to propose a role in the first diameter message sent to the H-PCRF. The standard defined diameter message is therefore extended with two modes of operation bits. The H-PCRF answers in the Diameter response message, having the same extension, with the selected mode of operation by setting the wanted combination of bits. The operator rules in the H-PCRF may have special adapted rule sets for each of these situations. One good example is maximum quota reservation or maximum time quota might stay reserved having different values in each mode Last part of the role determination is the active transfer of rules to be enforced by the V-PCRF. In practice this will be only valid for the full or limited local control mode. For this purpose the H-PCRF provides a set of rule in a container added in the Diameter response message. More detailed information on the rule set is given in the section transparent rule sets. For more information on the Diameter messages reference shall be made to IETF standards RFC 3588 and RFC 4006.

Concurrence Considerations

Only applicable in case the V-PCRF tries to enforce both local (visited) operator rules and home operator rules at the same time. This is only the case in full local mode.

In general the H-PCRF limits must prevail. If for example maximum credit request amount is Y the V-PCRF can in enforcement use less than Y if the local policy says so but not more. More difficult is resolution in case of non matching absolute values. Example is a defined bit rate of guaranteed 50 Mb by the H-PCRF where the visited operator network has 30, 60 or 90 Mb that can be enforced. The V-PCRF shall take the higher complying value for enforcement. It can also be possible that a requested value is not possible. Example bit error rate. The requested quality is not available in the visited network so the best provided option is enforced. In cases the network has no enforcement capability for a request, example: maximum delay time, then best effort shall be applied. In general the V-PCRF shall use equal, better or best possible for QoS rules and not exceed quota related rules. It shall be noted that some additional rules could be set for the V-PCRF to trigger the H-PCRF if special conditions occur. Here the V-PCRF partly has a PCEF type of role, although the triggers might be the result of triggers received by the V-PCRF, but could also be other events inside the V-PCRF.

Transparent Rule Sets

As pointed out in the modes of operation of the V-PRCF there are occasions where a rule set has to be transferred. Next to that also adding, deleting or updating of existing rules sets must be possible. An example set-up for transparent rule sets is discussed here.

In the rule enforcement process 3 different types of rules are defined;
Control; typically PCRF to PCEF setting values, actions e.g.
Trigger; typically PCEF to PCRF giving condition when to signal to PCRF.
Event; combination of triggers that change the applicability of certain rules.

In order to make update adding and deleting possible each rule in the rule set has a unique number within the rule set. When deleting just the number in the set update message is enough. Adding means a new number+rule is present and modification is existing number+rule definition.

A rule set, either initial or for updating, is composed by a start indicator "<;" followed by a rule where a rule is composed as a rule number, a "," and a rule definition. More rules can follow preceded by ";". The rule definition may not contain ";". The last rule definition is followed by rule set end indicator ";>"

The actual rule definition comprises a class identifier (CI), an initial state, a type and the rule body. Most important is the class identifier. If two identities need to understand each other rules then the entity on which the rule needs to take place need to have the same definition on both sides. When making a roaming agreement CIs shall be part of it. CI is a number denoting the entity like bit error rate, transfer rate, maximum reservation threshold etc. Several CIs are already standardised in 3GPP for various purposes. The initial state is either on or off denoted by a 1 or a 0. Certain event rules might change on to off and vice versa. The type is an integer 0, 1 or 2 denoting a type of rule (respectively: control=0, trigger=1 and event=2). The rule definition is so CI number followed by a ",," fooled by 1 or 0 for initial state followed by a "," followed by 0, 1 or 2 for the rule type followed by a ":" and then the rule body. The rule body depends on the rule type.

In case of a control rule the body is a list of values separated by ",". The CI determines if one or more values need to be provided or that an optional number of values can be entered as well as the sequence meaning. The value can be numerical but also text like as would be applicable for setting web address filtering.

In case of a trigger rule the body contains an upper (first) and lower (second) boundary value separated by a ",".
If first value=second value trigger is on reaching value.
If first value is omitted trigger is on less then second value.
If second value is omitted trigger is on exceeding the first value.
If first value>second value then trigger is if out side range given by the values.
If first value<second value then trigger is if inside range given by the values.

In case of an event value the body contains a Boolean trigger equation, a list of rules to switch off and a list of rules to switch on. For a rule that should be toggled it is stated in both list and is interpreted as change state to the opposite. All 3 are separated by ":". The Boolean trigger expression is the combination of rule numbers of trigger rules and "AND", "OR", "XOR", "NOT", "(" and ")". The other 2 lists contain rule numbers which can be any of the rules in the rule set. With an event rule the CI is don't care but must be present and can be used for indicative purposes.

For a person skilled in the art it might be clear that where the H-PCRF is stated also the OCS can be read. The V-PCRF then negotiates with the OCS in the home domain of the terminal on its specific role. It shall further be noted that the disclosed invention is not limited to fair usage policy control in roaming situations but can be considered for controlling all policies affected in situations where control on a rule set needs to be negotiated and subsequent handing over of rule sets and updates of them is required.

LIST OF ABBREVIATIONS

| | | |
|---|---|---|
| 3GPP | 3rd Generation Partnership Project | [Standardization body] |
| AF | Application Function | |
| APN | Access Point Name | |
| BBERF | Bearer Binding and Event Reporting Function | |
| BBF | Bearer Binding Function | |
| BE | Best Effort (for bearer QoS) | |
| CI | (control) Class Indicator | |
| CDR | Charging Data Record | |
| DOCSIS | Data Over Cable Service Interface Specification | [Access network technology] |
| DRA | Diameter Routing Agent | |
| ERF | Event Reporting Function | |
| GBR | Guaranteed Bit Rate (for Bearer) | |
| GSM | Global System for Mobile Communication | [Mobile network technology] |
| GPRS | General Packet Radio Service | [Mobile network technology] |
| HLR | Home Location Register | [Mobile network node] |
| H-PCEF | Home network PCEF | |
| H-PCRF | Home network PCRF | |
| ID | Identity/identification/identifier | |
| IETF | Internet Engineering Task Force | [Standardization body] |
| IMSI | International Mobile Subscriber Identity | [SS7 address type] |
| IP | Internet Protocol | |
| IP-CAN | IP Connectivity Access Network | |
| ISDN | International Subscriber Directory Number | [SS7 address type] |
| LTE | Long Term Evolution | [Mobile network technology] |
| MCC | Mobile Country Code | [IMSI address field] |
| MNC | Mobile Network Code | [IMSI address field] |
| MS | Mobile Station | |
| MSISDN | Mobile Station ISDN | [SS7 address type] |
| nodeB | Controlling node in Mobile network | |
| OCS | Online Charging System | |
| OFCS | Offline Charging System | |
| PCC | Policy and Charging Control | |
| PCEF | Policy and Charging Enforcement Function | |
| PCRF | Policy and Charging Rules Function | |
| PUI | Public User Identity | |
| QCI | QoS Class Indicator | |
| QoS | Quality of Service | |
| SPR | Subscription Profile Repository | |
| SS7 | Signalling System nr. 7 | [Telecom network subsystem] |
| UMTS | Universal Mobile Telecom System | [Mobile network technology] |
| V-PCEF | Visiting network PCEF | |
| V-PCRF | Visiting network PCRF | |
| WCDMA | Wide-band Code Division Multiple Access | [Mobile network technology] |
| WLAN | Wireless Local Area Network | [Mobile network technology] |

The invention claimed is:

1. A method for role determination of a first Policy and Charging Rule Function (PCRF) in a network visited by a roaming terminal having a subscription in a home network, where the first PCRF has determined that the terminal is roaming into the network, the method comprising:
  retrieving an address of a second PCRF in the home network by the first PCRF;
  checking if a roaming agreement exists with the home network;
  when the roaming agreement exists:
  taking the visiting network PCRF (V-PCRF) role by the first PCRF and negotiating a mode of operation with the second PCRF by the first PCRF, and the first PCRF assumes the negotiated mode of operations;
  when the negotiated mode of operation is full local mode or limited local mode, receiving, from the second PCRF, a set of rules to be enforced for the roaming terminal in the visited network, by the first PCRF;
  when the mode of operation is the full local mode, enforcing the received rules together with local operator rules for fair usage; and
  when the mode of operation is the limited local mode, enforcing the received rules without applying local operator rules for fair usage; and
  when the roaming agreement does not exist and local policies in the network allow limited access, assume limited PCRF role.

2. The method of claim 1, further comprising when determining that no roaming agreement exists, negotiating a temporary roaming agreement with the home network PCRF by the first PCRF and storing the temporary roaming agreement locally.

3. The method of claim 2, wherein the temporary roaming agreement is reused as long as it is not expired for other terminals having a subscription in the same home network.

4. The method of claim 1, where the address of the second PCRF is obtained by the first PCRF from one of an internal store with roaming agreements of the first PCRF or a diameter routing agent.

5. The method of claim 1, wherein when determining that the roaming agreement exists, the negotiation of a mode of operation comprises:
  sending, by the first PCRF, a first diameter message to the second PCRF which comprises a proposed mode of operation; and
  receiving, from the second PCRF, a diameter response message comprising a selected mode of operation.

6. The method of claim 1, wherein when no roaming agreement exists and the first PCRF has assumed the limited PCRF mode, the method further comprising:

providing a user of the roaming terminal limited rights access to home pages of a visiting network operator, the home pages comprising a web registration page providing the user the possibility to register with a credit card and to select options related to the registration, and the first PCRF assuming the full PCRF role after the user has registered and enforcing local rules based on the selected options.

7. A method for role determination of a Policy and Charging Rule Function (PCRF) in a home network of a roaming terminal, where the PCRF has received a first diameter message from a second PCRF in the network visited by the terminal, comprising:

taking a home network PCRF (H-PCRF) role;

checking if the first diameter message contains an additional mode of operation information element for negotiation of a mode of operation by the PCRF;

when the first diameter message contains the additional mode of operation information element for negotiation of a mode of operation by the PCRF, checking the requested mode of operation in the additional mode of operation information element against internal rules to determine a wanted mode of operation; and preparing a diameter answer message and including an additional mode of operation information element containing the wanted mode of operation;

when the wanted mode of operation is full local mode or limited local mode, sending, from the PCRF to the second PCRF, a set of rules to be enforced for the roaming terminal in the visited network;

wherein the set of rules is to be enforced together with local operator rules for fair usage when the wanted mode of operation is the full local mode; and wherein the set of rules is to be enforced without applying local operator rules for fair usage when the wanted mode of operation is the limited local mode.

8. The method of claim 7 further comprising adding to the diameter answer message a rule set container for initial transfer or update of the set of rules to be enforced in the network visited by the terminal.

9. The method of claim 7 wherein the first diameter message is a Credit Control Request message comprising a supported features value parameter including 2 bit positions for the wanted mode of operation.

10. The method of claim 7 wherein the first diameter message is a Credit Control Answer message comprising a supported features value parameter including 2 bit positions for the selected mode of operation.

11. The method of claim 10 wherein the first diameter message additionally comprises a rule set container.

12. A Policy and Charging Rule Function (PCRF) comprising a fair usage session controller for determining role and mode of operation of the PCRF, the fair usage session controller being configured to:

retrieve an address of a second PCRF in the home network by the PCRF;

check if a roaming agreement exists with the home network;

when the roaming agreement exists:

take the visiting network PCRF (V-PCRF) role by the PCRF and negotiate a mode of operation with the second PCRF by the PCRF, and the PCRF assumes the negotiated mode of operation;

when the negotiated mode of operation is full local mode or limited local mode, receiving, from the second PCRF, a set of rules to be enforced for the roaming terminal in the visited network, by the first PCRF;

when the mode of operation is the full local mode, enforcing the received rules together with local operator rules for fair usage; and when the mode of operation is the limited local mode, enforcing the received rules without applying local operator rules for fair usage; and when the roaming agreement does not exist and local policies in the network allow limited access, assume limited PCRF role.

13. The PCRF of claim 12 further comprising a PCRF locator for storing roaming agreements accessible by the fair usage session controller for storing and retrieving roaming agreements and PCRF addresses.

14. The PCRF of claim 12 further comprising an inter PCRF interface handler, connected to the fair usage session controller, configured to send and receive diameter messages having an additional mode of operation information element for negotiation of a mode of operation.

15. The PCRF of claim 12 further comprising an inter PCRF interface handler connected to the fair usage session controller and equipped for sending and receiving diameter messages having a rule set container for initial transfer or update of a rule set.

* * * * *

UNITED STATES PATENT AND TRADEMARK OFFICE
CERTIFICATE OF CORRECTION

| | |
|---|---|
| PATENT NO. | : 8,769,098 B2 |
| APPLICATION NO. | : 13/390901 |
| DATED | : July 1, 2014 |
| INVENTOR(S) | : Castro et al. |

Page 1 of 1

It is certified that error appears in the above-identified patent and that said Letters Patent is hereby corrected as shown below:

In the Specification

Column 3, Line 31, delete "PORE" and insert -- PCRF. --, therefor.

Column 4, Line 9, delete "PECF/BBERF" and insert -- PCEF/BBERF --, therefor.

Figure 2A:
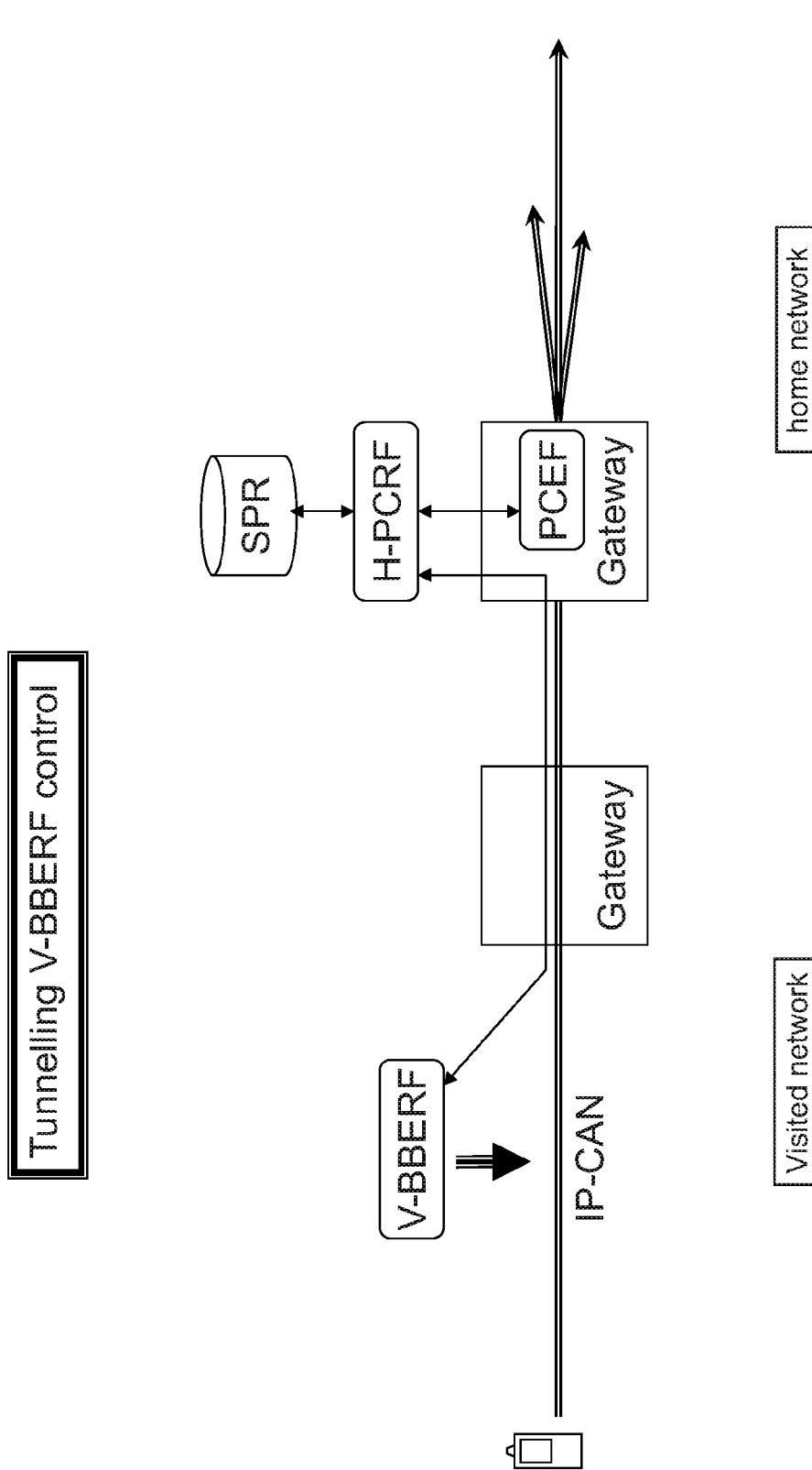
FIG. 2a shows a configuration for rule enforcement with control of the V-BBERF via a tunnel to the home gateway.
Figure 3:
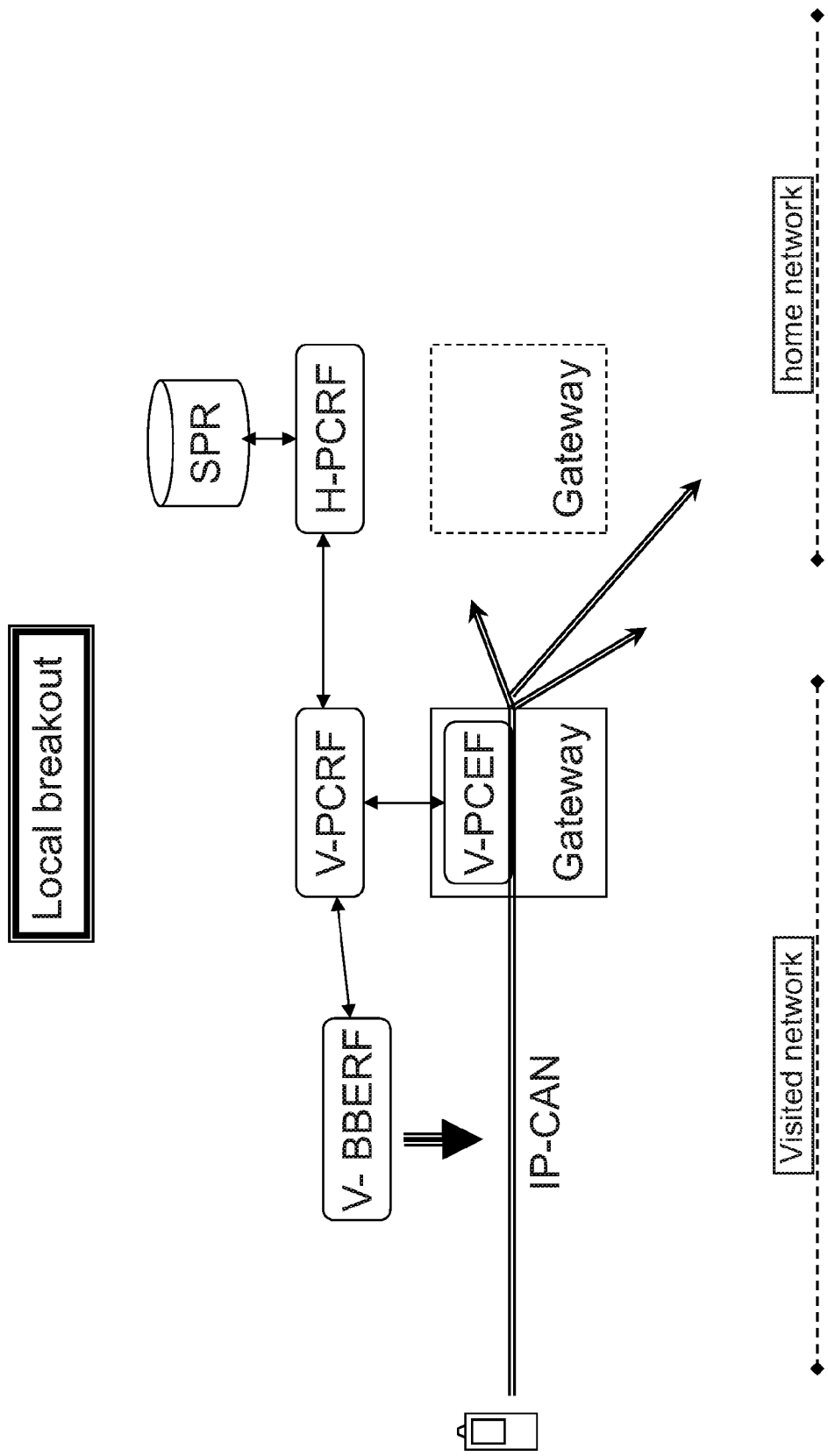
FIG. 3 shows a Roaming local break-out.

Column 4, Line 21, delete "FIG. 2ashows" and insert -- FIG. 2a shows --, therefor.

Figure 2B:
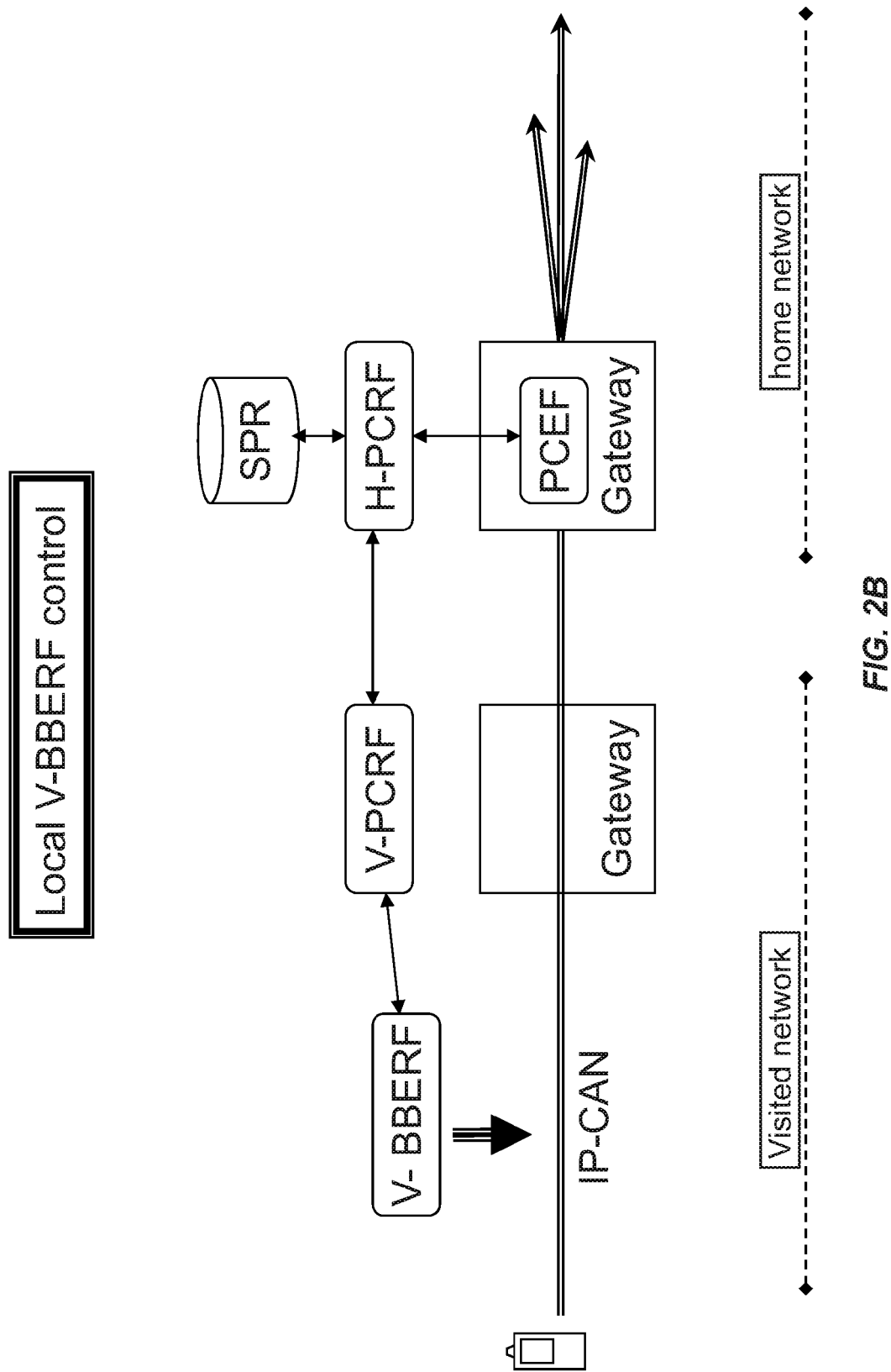
FIG. 2b shows a configuration for rule enforcement with control of the V-BBERF by the local PCRF in the visited network.

Column 4, Line 23, delete "FIG. 2bshows" and insert -- FIG. 2b shows --, therefor.

Column 5, Line 20, delete "V-PRCF and a H-PRCF" and insert -- V-PCRF and a H-PCRF --, therefor.

Column 6, Line 27, delete "PRCFs" and insert -- PCRFs --, therefor.

Column 7, Line 25, delete "mode" and insert -- mode. --, therefor.

Column 7, Line 63, delete "V-PRCF" and insert -- V-PCRF --, therefor.

Signed and Sealed this
Tenth Day of March, 2015

Michelle K. Lee
*Deputy Director of the United States Patent and Trademark Office*